(12) United States Patent
Son et al.

(10) Patent No.: US 12,602,820 B2
(45) Date of Patent: Apr. 14, 2026

(54) METHOD AND APPARATUS WITH ATTENTION-BASED OBJECT ANALYSIS

(71) Applicant: Samsung Electronics Co., Ltd.,
Suwon-si (KR)

(72) Inventors: Hyeongseok Son, Suwon-si (KR);
Seungin Park, Suwon-si (KR); Byung In Yoo, Suwon-si (KR); Dongwook Lee, Suwon-si (KR); Solae Lee, Suwon-si (KR); Sangil Jung, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 370 days.

(21) Appl. No.: 18/342,892

(22) Filed: Jun. 28, 2023

(65) Prior Publication Data
US 2024/0153130 A1 May 9, 2024

(30) Foreign Application Priority Data

Nov. 7, 2022 (KR) ........................ 10-2022-0146995
Dec. 23, 2022 (KR) ........................ 10-2022-0183136

(51) Int. Cl.
*G06T 7/73* (2017.01)
*G06T 7/50* (2017.01)
(Continued)

(52) U.S. Cl.
CPC .................. *G06T 7/73* (2017.01); *G06T 7/50* (2017.01); *G06V 10/25* (2022.01); *G06V 10/764* (2022.01); *G06V 10/771* (2022.01)

(58) Field of Classification Search
CPC .. G06T 7/73; G06T 7/50; G06V 10/25; G06V 10/764; G06V 10/771; G06V 10/454; G06V 2201/07; G06V 10/82
See application file for complete search history.

(56) References Cited

U.S. PATENT DOCUMENTS

| | | | | |
|---|---|---|---|---|
| 2018/0137642 | A1* | 5/2018 | Malisiewicz | ............. G06T 7/70 |
| 2020/0082614 | A1* | 3/2020 | Xu | ......................... G06V 20/17 |

(Continued)

FOREIGN PATENT DOCUMENTS

| | | | | |
|---|---|---|---|---|
| CN | 115131820 | A | * | 9/2022 ............. G06V 40/10 |
| CN | 115601620 | A | * | 1/2023 ........... G06V 10/806 |

OTHER PUBLICATIONS

Liu, Shilong, et al. "Dab-detr: Dynamic anchor boxes are better queries for DETR." *arXiv preprint* arXiv:2201.12329 (2022).

(Continued)

*Primary Examiner* — Amandeep Saini
*Assistant Examiner* — Andrew S Budisalich
(74) *Attorney, Agent, or Firm* — NSIP Law

(57) ABSTRACT

An apparatus includes one or more processors configured to generate a plurality of feature maps having respective different resolutions based on an input image; and update, for each of the plurality of transformer layers, respective position estimation information comprising first position information of a respective bounding box corresponding to one object query and second position information of respective key points corresponding to the one object query, wherein each of the plurality of transformer layers includes a self-attention model configured to generate respective intermediate data by performing self-attention on respective content information on a feature of the input image; and a cross-attention model configured to generate respective output data by performing cross-attention on respective one or more feature maps among the plurality of feature maps and the respective generated intermediate data.

18 Claims, 6 Drawing Sheets

(51) Int. Cl.

| | | |
|---|---|---|
| *G06V 10/25* | (2022.01) | |
| *G06V 10/764* | (2022.01) | |
| *G06V 10/771* | (2022.01) | |

(56) References Cited

U.S. PATENT DOCUMENTS

| | | |
|---|---|---|
| 2021/0383199 A1 | 12/2021 | Weissenborn et al. |
| 2022/0101007 A1 | 3/2022 | Kadav et al. |
| 2022/0180548 A1 | 6/2022 | Le et al. |
| 2022/0301304 A1* | 9/2022 | Hampali ................ G06N 3/045 |
| 2024/0096074 A1* | 3/2024 | Okorn .................. G06N 3/0455 |

OTHER PUBLICATIONS

Zhu, Xizhou, et al. "Deformable DETR: Deformable transformers for end-to-end object detection." *arXiv preprint* arXiv:2010.04159 (2020).

Yang, Sen, et al. "Transpose: Keypoint localization via transformer." *Proceedings of the IEEE/CVF International Conference on Computer Vision.* 2021.

Guo, Ruohao, et al. "Sotr: Segmenting objects with transformers." Proceedings of the IEEE/CVF international conference on computer vision, Aug. 15, 2021. (pp. 7157-7166).

Korean Office Action issued on Jan. 21, 2026, in counterpart Korean Patent Application No. 10-2022-0183136 (4 pages in English, 10 pages in Korean).

Liu, Shilong, et al. "Dab-detr: Dynamic anchor boxes are better queries for detr." Published as a conference paper at ICLR 2022, arXiv preprint arXiv:2201.12329v4, Mar. 30, 2022. (pp. 1-19).

Shi, Dahu, et al. "End-to-end multi-person pose estimation with transformers." Proceedings of the IEEE/CVF conference on computer vision and pattern recognition, Jun. 18, 2022. (pp. 11059-11068).

Zhu, Xizhou, et al. "Deformable detr: Deformable transformers for end-to-end object detection." Published as a conference paper at ICLR 2021, arXiv preprint arXiv:2010.04159v4, Mar. 18, 2021. (pp. 1-16).

* cited by examiner

METHOD AND APPARATUS WITH ATTENTION-BASED OBJECT ANALYSIS

CROSS-REFERENCE TO RELATED APPLICATIONS

This application claims the benefit under 35 USC § 119(a) of Korean Patent Application No. 10-2022-0146995, filed on Nov. 7, 2022 and Korean Patent Application No. 10-2022-0183136, filed on Dec. 23, 2022, in the Korean Intellectual Property Office, the entire disclosures of which are incorporated herein by reference for all purposes.

BACKGROUND

1. Field

The following description relates to a method and apparatus with attention-based object analysis.

2. Description of Related Art

An object detection technology is used in various application fields such as robots, video surveillance, and automotive safety.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus may include a memory configured to store a transformer network comprising a plurality of transformer layers each performing self-attention and cross-attention; one or more processors configured to generate a plurality of feature maps having respective different resolutions based on an input image; and update, for each of the plurality of transformer layers, respective position estimation information comprising first position information of a respective bounding box corresponding to one object query and second position information of respective key points corresponding to the one object query, wherein an implementation of the plurality of layers for the updating includes a provision of the plurality of generated feature maps to the transformer network, and wherein each of the plurality of transformer layers comprises a self-attention model configured to generate respective intermediate data by performing self-attention on respective content information on a feature of the input image; and a cross-attention model configured to generate respective output data by performing cross-attention on respective one or more feature maps among the plurality of feature maps and the respective generated intermediate data.

The key points corresponding to the one object query may indicate a plurality of sampling points representing a physical structure or shape of one object positioned in the input image indicated by the one object query.

The one or more processors may be configured to, for each of the plurality of transformer layers update, dependent on a result of the cross-attention model performed on the respective generated intermediate data, previous content information on the feature of the input image stored in a decoder embedding memory, and store the updated content information in the decoder embedding memory; and update, dependent on the result of the cross-attention model, previous first position information of a previous respective bounding box and previous second position information of previous key points, respectively stored in a learnable query memory, to respectively generate the updated first position information of the respective bounding box and generate the updated second position information of the respective key points, and store the updated first position information of the respective bounding box and the updated second position information of the respective key points in the learnable query memory.

The one or more processors may be configured to calculate a key and a query to be input to the self-attention model of a target transformed layer, based on the content information corresponding to the one object query loaded from the decoder embedding memory, corresponding to previously updated respective content information previously stored to the decoder embedding memory with respect to a previous transformer layer, and position estimation information corresponding to the one object query, loaded from the learnable query memory, corresponding to previously updated position estimation information previously stored to the learnable query memory with respect to the previous transformer layer.

The one or more processors may be configured to determine the respective one or more feature maps as a value to be input to the cross-attention model of the target transformer layer.

The one or more processors may be configured to calculate a query to be input to the cross-attention model of a target transformer layer, based on intermediate data calculated from the self-attention model of the target transformer layer and position estimation information corresponding to the one object query, loaded from the learnable query memory, corresponding to previously updated position estimation information previously stored to the learnable query memory with respect to a previous transformer layer.

The one or more processors may be configured to set a reference point to be input to the cross-attention model of a target transformer layer based on a corresponding first position information of a bounding box corresponding to the one object query, loaded from the learnable query memory, corresponding to previously updated first position information previously stored to the learnable query memory with respect to a previous transformer layer; and set a sampling offset to be input to the cross-attention model of the target transformer layer based on a corresponding second position information of key points corresponding to the one object query, loaded from the learnable query memory, corresponding to previously updated second position information previously stored to the learnable query memory with respect to the previous transformer layer.

For each of the plurality of transformer layers, the one or more processors may be configured to calculate each of a first relative offset for the first position information of the respective bounding box corresponding to the one object query and a second relative offset for the second position information of the respective key points corresponding to the one object query, based on the generated respective output data and the position estimation information corresponding to the one object query loaded from the learnable query memory.

The apparatus may include a task performing model configured to perform at least one of identification of a class for an object indicated by the one object query or generation of a segmentation mask corresponding to the object indicated by the one object query based on content information and position estimation information corresponding to the one object query output from the transformer network.

The one or more processors may be configured to generate a plurality of temporary feature maps for a training input image based on an input of the training input image to a feature map extraction model; calculate, for each of preset object queries, temporary position estimation information comprising temporary first position information of a respective bounding box and temporary second position information of respective key points, based on an input of the plurality of generated temporary feature maps to an in-training transformer network; calculate a loss function based on the calculated temporary position estimation information and training output data; and generate the transformer network by iteratively training of the in-training transformer network to minimize the calculated loss function.

In another general aspect, a processor-implemented method may include generating a plurality of feature maps having respective different resolutions based on an input image; and updating, for each of a plurality of transformer layers, respective position estimation information comprising first position information of a respective bounding box corresponding to one object query and second position information of respective key points corresponding to the one object query, wherein an implementation of the plurality of transformer layers for the updating includes a provision of the plurality of generated feature maps to a transformer network comprising the plurality of layers each performing self-attention and cross-attention, wherein each of the plurality of transformer layers comprises: a self-attention model configured to generate respective intermediate data by performing self-attention on respective content information on a feature of the input image; and a cross-attention model configured to generate respective output data by performing cross-attention on respective one or more feature maps among the plurality of feature maps and the respective generated intermediate data.

The updating may include updating, dependent on a result of the cross-attention model performed on the respective generated intermediate data, previous content information on the feature of the input image stored in a decoder embedding memory, and storing the updated content information in the decoder embedding memory; and updating, dependent on the result of the cross-attention model, previous first position information of a previous respective bounding box and previous second position information of previous key points, respectively stored in a learnable query memory, to respectively generate the updated first position information of the respective bounding box and generate the updated second position information of the respective key points, and storing the updated first position information of the respective bounding box and the updated second position information of the respective key points in the learnable query memory.

The updating may include calculating a key and a query to be input to the self-attention memory of a target transformed layer, based on the content information corresponding to the one object query loaded from the decoder embedding memory, corresponding to previously updated respective content information previously stored to the decoder embedding memory with respect to a previous transformer layer, and position estimation information corresponding to the one object query loaded from the learnable query memory, corresponding to previously updated position estimation information previously stored to the learnable query memory with respect to the previous transformer layer.

The respective one or more feature maps may be determined as a value to be input to the cross-attention model of the target transformer layer.

The updating may include calculating a query to be input to the cross-attention model of a target transformer layer, based on intermediate data calculated from the self-attention model of the target transformer layer and position estimation information corresponding to the one object query, loaded from the learnable query memory, corresponding to previously updated position estimation information previously stored to the learnable query memory with respect to a previous transformer layer.

The updating may include setting a reference point to be input to the cross-attention model of a target transformer layer based on a corresponding first position information of a bounding box corresponding to the one object query loaded from the learnable query memory, corresponding to previously updated first position information previously stored to the learnable query memory with respect to a previous transformer layer; and setting a sampling offset to be input to the cross-attention model of the target transformer layer based on a corresponding second position information of key points corresponding to the one object query, loaded from the learnable query memory, corresponding to previously updated second position information previously stored to the learnable query memory with respect to the previous transformer layer.

The method may include calculating each of a first relative offset for the first position information of the respective bounding box corresponding to the one object query and a second relative offset for the second position information of the respective key points corresponding to the one object query, based on the generated respective output data and the position estimation information corresponding to the one object query loaded from the learnable query memory.

The method may include performing at least one of identification of a class for an object indicated by the one object query or generation of a segmentation mask corresponding to the object indicated by the one object query based on content information and position estimation information corresponding to the one object query output from the transformer network.

The method may include generating a plurality of temporary feature maps for a training input image based on an input of the training input image to a feature map extraction model; calculating, for each of present object queries, temporary position estimation information comprising temporary first position information of a respective bounding box and temporary second position information of respective key points, based on an input of the plurality of generated temporary feature maps to an in-training transformer network; calculating a loss function based on the calculated temporary position estimation information and training output data; and generating the transformer network by iteratively training of the in-training transformer network to minimize the calculated loss function.

Other features and aspects will be apparent from the following detailed description, the drawings, and the claims.

5

6

Figure 3:
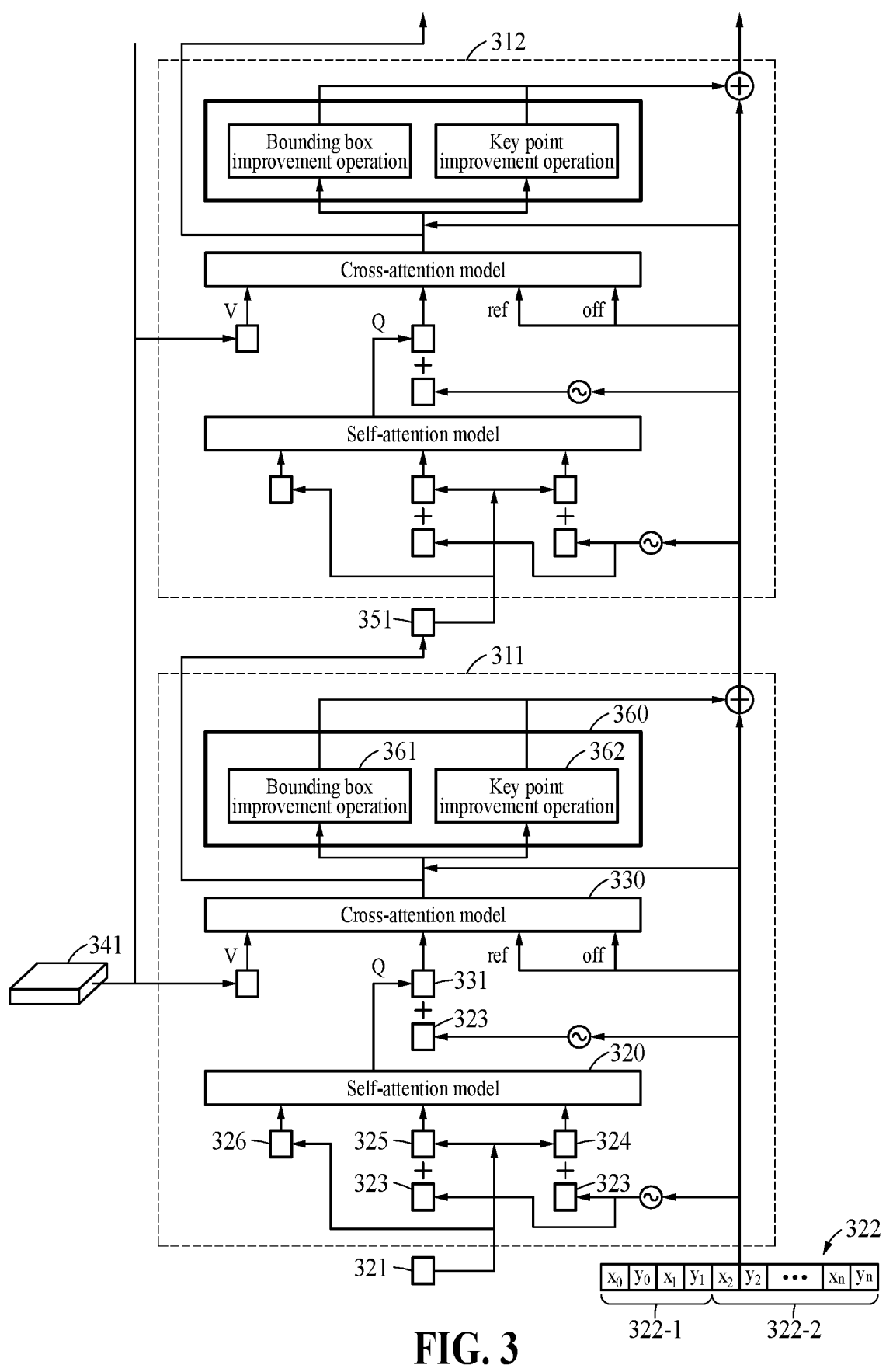

FIG. 3 illustrates an example operation performed in each of a plurality of layers included in a decoder layer group of a transformer network according to one or more embodiments.

Figure 4A:
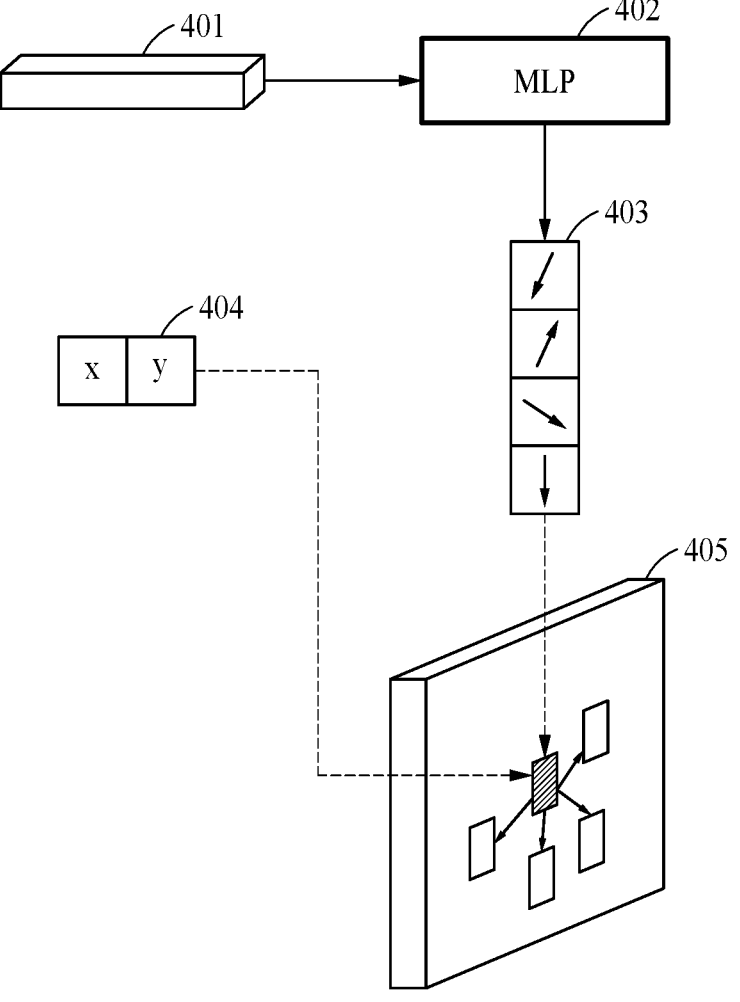
Figure 4B:
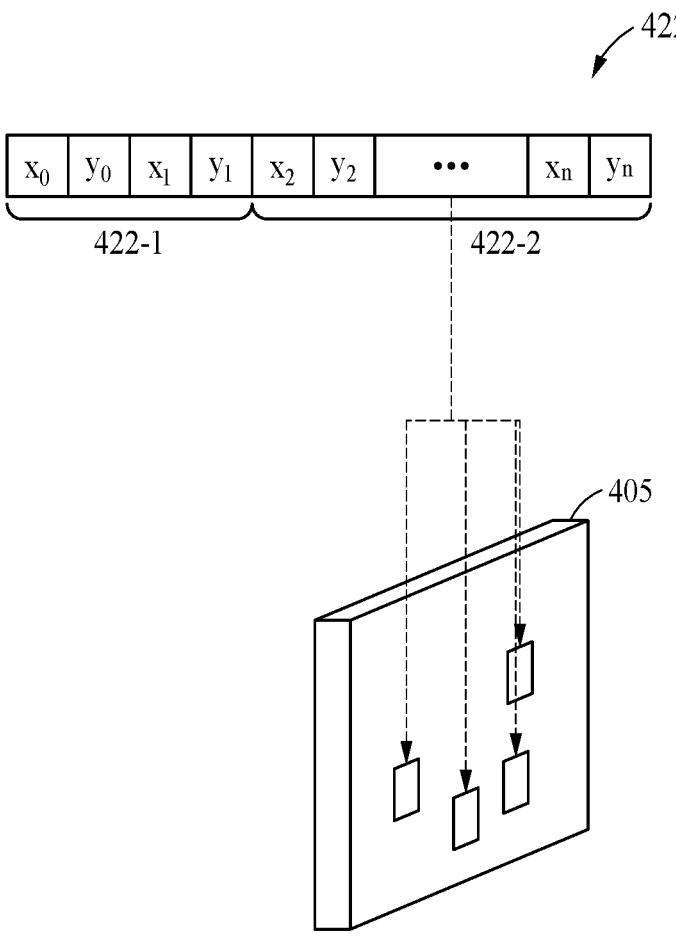

FIG. 4A illustrates an implementation of a deformable attention model, and FIG. 4B illustrates an example deformable attention model according to one or more embodiments.

Figure 5:
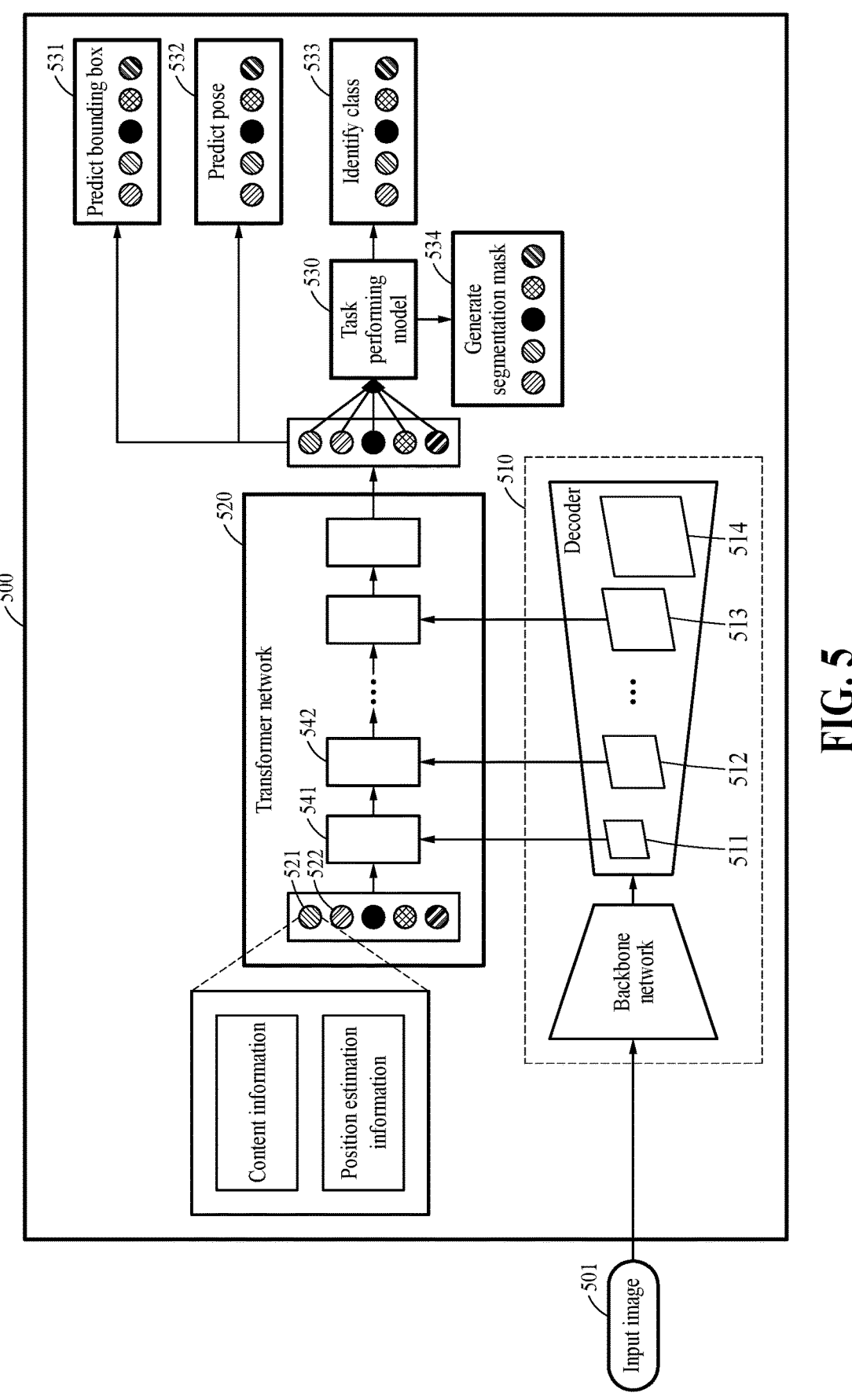

FIG. 5 illustrates an example computing apparatus that further includes a task performing model according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C', and the like are intended to have disjunctive meanings, and these phrases "at least one of A, B, and C", "at least one of A, B, or C', and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. It is to be understood that if a component (e.g., a first component) is referred to, with or without the term "operatively" or "communicatively," as "coupled with," "coupled to," "connected with," or "connected to" another component (e.g., a second component), it means that the component may be coupled with the other component directly (e.g., by wire), wirelessly, or via a third component.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Typically, unlike object classification, a non-limiting example object detection may identify an object at least according to a determined position (e.g., from an image), and may at a same time (e.g., simultaneously) identify and estimate a position of an object from an example image using an attention-based machine learning model.

Figure 1:
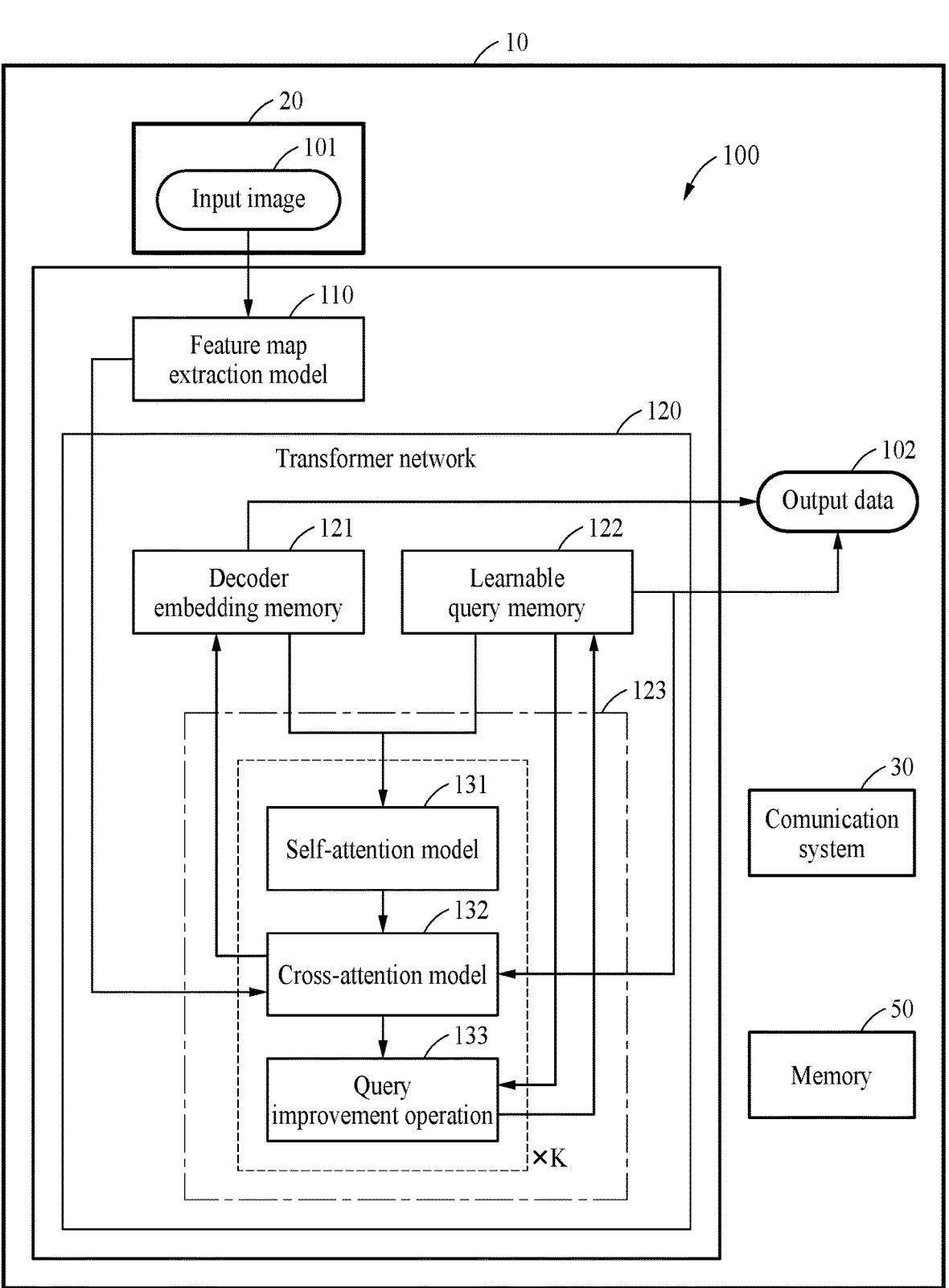
FIG. 1 illustrates an example computing apparatus and corresponding operation flows of object analyses according to one or more embodiments.

FIG. 1 illustrates an example computing apparatus and corresponding operation flows, e.g., of an electronic device or system 10, according to one or more embodiments.

Based on an input image 101 that may be captured by an image sensor 20 (e.g., a camera) of the electronic apparatus system 10, or received from a communication system 30 from an image sensor exterior of the electronic device or system 10, including the image sensor, an example computing apparatus 100 may estimate, from the input image 101, position information of a bounding box corresponding to an object positioned on the input image 101 and position information of key points corresponding to the object. The computing apparatus 100 may include a feature map extraction model 110 and a transformer network 120. The computing apparatus 100 may be a processor configured to perform the operations described herein. The processor may execute instructions stored in memory 50, the execution of which may configure the processor to perform any one or any combination of operations described herein. The memory 50 may also store any or all models and networks described herein. The computing apparatus 100 may also be representative of the processors and memory 50 or another memory storing such instructions, models, or networks.

Based on the received input image 101, the feature map extraction model 110 may be implemented to extract a plurality of feature maps of the input image 101. In one example, the feature map extraction model 110 may generate, e.g., output, a plurality of feature maps having different resolutions for the input image 101.

The computing apparatus 100 also includes other elements that will be described below associated with the description of FIG. 2.

Figure 2:
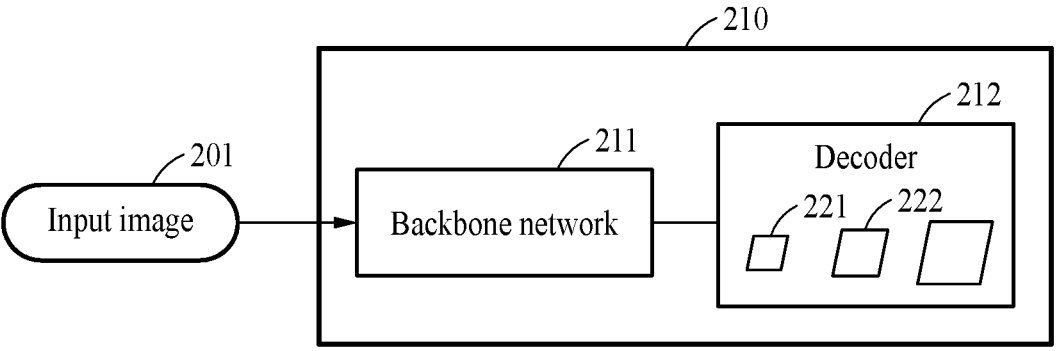
FIG. 2 illustrates an example model configured to extract a feature map according to one or more embodiments.

FIG. 2 illustrates an example feature map extraction model according to one or more embodiments. Referring to FIG. 2, an example feature map extraction model 210 (e.g., the feature map extraction model 110 in FIG. 1) may include a backbone network 211 and a decoder 212, which include machine learning models (e.g., neural networks which each may include one or more layers). The backbone network 211 may receive an input image 201 (e.g., the input image 101 of FIG. 1) and extract features of the input image 201 by performing a convolution operation on the input image 201. The backbone network 211 may include a convolution neural network (CNN), which may be a convolutional block of ResNet-50 or ResNet-101 as a non-limiting example. The decoder 212 may be configured to receive the features of the input image 201 from the backbone network 211, and to generate a plurality of feature maps based on the received features. The plurality of feature maps may have respective different resolutions (e.g., scales) so that the decoder 212 may detect objects with various sizes in the input image 201. As an example operation, the decoder 212 may generate a first feature map 221 having a first resolution by combining the features of the input image 201, a second feature map 222 having a second resolution that is higher than the first resolution by upscaling the first feature map 221, and remaining feature maps having respective different resolutions that may be different than a resolution of a previous feature map. With such an example operation, the decoder 212 may generate a plurality of feature maps having different resolutions in response to respective input features of an input image received from the backbone network 211. An operation performed by the feature map extraction model 210 may also be expressed as being performed by the processor of a computing apparatus (e.g., the computing apparatus 100 in FIG. 1).

The computing apparatus 100 may input the plurality of feature maps (e.g., including the feature map 221 and the feature map 222) of the input image 201 generated by the feature map extraction model 210 to a transformer network (e.g., the transformer network 120 of FIG. 1).

Referring back to FIG. 1, the transformer network 120 may include a decoder embedding memory 121, a learnable query memory 122, and a decoder layer group 123.

The decoder layer group 123 may include a plurality of transformer decoder layers (hereinafter, referred to as 'layers'). For example, the decoder layer group 123 may include K layers and K herein is a natural number greater than or equal to 1. Each of the plurality of layers may include a self-attention layer 131 that is configured to generate intermediate data by performing self-attention on content information on the feature of the input image 101, and a cross-attention layer 132 that is configured to generate final data by performing cross-attention on one or more feature maps of the plurality of feature maps for the input image 101 generated by the feature map extraction model 110 and the intermediate data generated from the self-attention layer 131. The self-attention and cross-attention layers may each include one or more sub-layers.

The computing apparatus 100 may be configured to set a plurality of object queries in advance to detect an object positioned in the input image 101. Each object query may be a learnable vector for detecting information on one corresponding object positioned in an input image. For example, the computing apparatus 100 may preset n object queries (n may be a natural number greater than or equal to 2), which may correspond to n objects positioned in the input image 101, respectively. Thus, one object query may be connected to one corresponding object positioned in the input image 101. The computing apparatus 100 may obtain information for estimating a position of the object connected to the corresponding object query in the input image 101 by inputting feature maps of the input image 101 for each of the set object queries to the transformer network 120. The object query may include content information on the object indicated by the corresponding object query and position estimation information on the object indicated by the corresponding object query. In one example, the computing apparatus 100 may preset a larger number of object queries than the number of objects positioned in the input image 101, and thus, there are object queries with no objects to be connected. For an object query with no corresponding object to be connected, the computing apparatus 100 does not calculate content information and position estimation information in such an object query, and may connect such an object query to a no-object class.

According to an example, each of the plurality of layers may further include a query improvement operation 133 that calculates a first relative offset for first position information of a bounding box corresponding to an object and a second relative offset for second position information of key points corresponding to the object.

According to an example, the feature map extraction model 110 may generate the plurality of feature maps from the input image 101 and input the generated feature maps to the transformer network 120. Based on the generated feature maps, the computing apparatus 100 may update the position estimation information including the first position information of the bounding box corresponding to one object query from each of the plurality of layers and the second position information of the key points corresponding to the one object query. In other words, the computing apparatus 100 may update the position estimation information including the first position information of a bounding box of an object connected to a corresponding object query and the second position information of key points of the object connected to the corresponding object query, for each of the set object queries.

The decoder embedding memory 121 may be configured to store updated content information on a feature of an input image for each preset object query. In an example, the below described decoder embedding memory 121 may also be representative of a processor and a memory, where the processor may be configured to update the content information, e.g., perform the below operations with respect to the decoder embedding memory. Accordingly, while description below may refer to a processor of the computing apparatus performing such operation and or the decoder embedding memory performing such operation, such discussion are applicable to both the decoder embedding memory examples.

The learnable query memory 122 may be configured to store and update position estimation information including the first position information of a bounding box corresponding to an object query for each of the preset object queries and the second position information of key points corresponding to the object query. For example, the learnable query memory 122 may include an embedded bounding box storage and an embedded key point storage. The bounding box storage may store updated the first position information of the bounding box corresponding to the object query and the key point storage may store updated the second position information of key points corresponding to the object query. In an example, the learnable query memory 122 may also be representative of a processor and a memory, where the processor may be configured to update the position estimation information, e.g., perform the below operations with respect to the learnable query memory. Accordingly, while description below may refer to a processor of the computing apparatus performing such operation and or the learnable query memory performing such operation, such discussion is applicable to both the learnable query memory examples.

The bounding box corresponding to the object query may indicate a box surrounding a region of an object indicated by the object query. The bounding box may have a rectangular shape, but the shape of the bounding box is not limited thereto. The first position information of the bounding box may represent a position of a bounding box in an input image. For example, when the bounding box has a rectangular shape, the position information of the bounding box corresponding to the object query may represent position coordinates of a first vertex of the bounding box corresponding to the object query and position coordinates of a second vertex that is positioned at a diagonal of the first vertex of the bounding box.

Example key points corresponding to the object query may include a plurality of sampling points representing an object indicated by the object query. In other words, such example key points corresponding to the object query may include a plurality of sampling points representing a structure or shape of an object indicated by the object query. For example, the key points corresponding to the object query may include a plurality of sampling points positioned on a boundary line surrounding a region corresponding to an object indicated by the object query. For example, when the object indicated by the object query is a human, the example key points corresponding to the object query may include sampling points positioned on a human skeleton. The second position information of the example key points may include position information of each of the plurality of sampling points. For example, the second position information of the example key points may represent position coordinates of each of the plurality of sampling points.

As described above, the computing apparatus 100 may be configured to update the position estimation information including the first position information of the bounding box corresponding to one object query and the second position information of the key points corresponding to the one object query in each of the plurality of layers included in the decoder layer group 123.

The computing apparatus 100 may be configured to load content information corresponding to the one object query from the decoder embedding memory 121 and load position estimation information corresponding to the one object query from the learnable query memory 122. The computing apparatus 100 may be configured to calculate the content information (e.g., each of a transformer key, query, and value) to be input to the self-attention model 131 of one layer of the plurality of layers based on the loaded content information corresponding to the one object query and the loaded position estimation information corresponding to the one object query. The computing apparatus 100 may be configured to generate intermediate data for the one layer by inputting the calculated content information (e.g., the calculated key, query, and value) to the self-attention model 131 of the one layer.

According to an example, the cross-attention model 132 included in each of the plurality of layers may be a deformable attention model. The computing apparatus 100 may set content data including a reference point, a sampling offset, a query, and a value to be input to the cross-attention module 132 based on one or more feature maps among the plurality feature maps generated from the feature map extraction model 110, the intermediate data calculated from the self-attention model 131 of the one layer, and the position estimation information corresponding to the one object query loaded from the learnable query memory 122. The computing apparatus 100 may then generate final data for one layer by inputting the reference point, sampling offset, query, and value to the cross-attention model 132 of the one layer, which is configured to calculate these content data to generate the final data for the one layer.

The computing apparatus 100 may be configured to transmit the final data from the cross-attention model 132 of the one layer to the decoder embedding memory 121. The decoder embedding memory 121 may update the final data for the one layer received from the cross-attention model 132 of the one layer as the content information of the object indicated by the one object query, and store the updated content information.

The computing apparatus 100 may input the final data for the one layer calculated from the cross-attention model 132 of the one layer and the position estimation information of the object indicated by the one object query loaded from the learnable query memory 122 to the query improvement operation 133 of the one layer. The query improvement operation 133 of the one layer may include calculation of a first relative offset for the first position information of the bounding box corresponding to the one object query and a second relative offset for the second position information of the key points corresponding to the one object query and transmit the first and second relative offsets to the learnable query memory 122. The learnable query memory 122 may update the first position information of the bounding box corresponding to the one object query by using the first relative offset received from the query improvement operation 133 of the one layer. The learnable query memory 122 may update the second position information of the key points corresponding to the one object query by using the second relative offset received from the query improvement operation 133 of the one layer. The learnable query memory 122 may update the position estimation information corresponding to the one object query by updating the first position information of the bounding box and the second position information of the key points corresponding to the one object query, and store the updated position estimation information.

In order to update the position estimation information corresponding to the one object query in a next layer of the one layer, the computing apparatus 100 may be configured to use the updated content information stored in the decoder embedding memory 121 and the updated position estimation information stored in the learnable query memory 122.

The computing apparatus 100 may be configured to update the content information corresponding to the one object query and update the position estimation information corresponding to the one object query, in each of the plurality of layers included in the decoder layer group 123 of the transformer network 120. The computing apparatus 100 may be configured to output, as output data 102, the content information and the position estimation information which are respectively updated in layers up to the last layer stored in the decoder layer group 123.

FIG. 3 illustrates an example computing apparatus performing an object analysis operation in each of a plurality of layers included in a decoder layer group of a transformer network implemented by a computing apparatus. In an example, the computing apparatus may be the computing apparatus 100 of FIG. 1.

A transformer network of the computing apparatus may include a decoder layer group (e.g., the decoder layer group 123 of FIG. 1) including a plurality of layers (e.g., a first layer 311 and a second layer 312). For example, referring to FIG. 3, the first layer 311 may be an input layer, and the second layer 312 may also be an input layer for a next layer of the first layer 311. Hereinafter, it is described that the decoder layer group includes two input layers, but the example is not limited thereto, and the decoder layer group may include three or more input layers.

The computing apparatus may be configured to load content information 321 corresponding to one object query from a decoder embedding model (e.g., the decoder embedding memory 121 of FIG. 1), and load position estimation information 322 corresponding to the one object query from a learnable query model (e.g., the learnable query memory 122 of FIG. 1). As described above, the position estimation information 322 may include first position information 322-1 of a bounding box corresponding to the one object query and second position information 322-2 of key points corresponding to the one object query. For example, as shown in FIG. 3, the first position information 322-1 may represent position coordinates (x0, y0) of a first vertex of the bounding box and position coordinates (x1, y1) of a second vertex positioned at a diagonal of the first vertex. The second position information 322-2 may represent position coordinates (e.g., (x2, y2), (x3, y3), etc.) of each of a plurality of sampling points representing a structure or shape of an object indicated by the one object query.

According to an example, the computing apparatus may be configured to calculate a key and a query to be input to a self-attention model 320 of the first layer 311 based on the content information 321 corresponding to the one object query loaded from the decoder embedding model and the position estimation information 322 corresponding to the one object query loaded from the learnable query model.

The self-attention model 320 of the first layer 311 may perform self-attention by applying weights to portions to be inferred important in specific data and reflecting this again. The self-attention model 320 of the first layer 311 may include an attention layer, which may be configured to calculate attention weightings. Thus, the computing apparatus may improve an object query through the self-attention. In other words, a key, query, and value input to the self-attention model 320 may be information included in the object query. The value of the self-attention model 320 may be set based on the content information corresponding to the object query, and the key and the query of the self-attention model 320 may be set based on the content information and the position estimation information corresponding to the object query.

N query vectors (e.g., N×C), M key features (e.g., M×C), and M value features (e.g., M×C) may be input to the attention layer of the self-attention model 320. Here, N and M each represent a natural number greater than or equal to 1, and C represents a channel dimension of a feature. In one example, a similarity matrix between the query and the key may be calculated, and the calculated similarity matrix may have a size of N×M. In addition, when the similarity matrix (e.g., N×M) is multiplied by the value feature (e.g., M×C), a matrix having a size of N×C (e.g., (N×M)×(M×C)) may be derived. The derived matrix having a size of N×C may be represented by N vectors, and the N vectors may be an output of the attention layer of the self-attention model 320. Each of the N vectors may represent a result of performing the attention on a portion having a high similarity between the key and the query in the M value features. In other words, each of the N vectors (e.g., 1×C) may be calculated by a weighted sum of the M value features.

The computing apparatus may be configured to generate corrected position estimation information 323 by performing positional encoding on the position estimation information 322 including the first position information 322-1 of the bounding box and the second position information 322-2 of the key points corresponding to one object query. The computing apparatus may calculate a key vector 324 and a query vector 325 based on the content information 321 and the corrected position estimation information 323. The computing apparatus may calculate a value vector 326 based on the content information 321. The computing apparatus may input the calculated key vector, query vector, and value vector to the self-attention model 320 of the first layer 311. The self-attention model 320 may calculate a similarity matrix between the query and the key, and calculate a weighted average of the value based on a weight corresponding to the calculated similarity matrix. The self-attention model 320 may output the weighted average of the value as intermediate data.

For example, the self-attention model 320 may calculate a score matrix representing a relation between a query and a key. The score matrix may be derived by a scaled dot-product attention operation as shown in Equation 1 below.

$$S = \frac{QK^T}{\sqrt{d_k}} \qquad \text{Equation 1}$$

In Equation 1, S represents a score matrix, Q represents a query vector, K represents a key vector, T represents a transpose matrix, and $d_k$ represents a dimension of a key vector.

The self-attention model 320 may apply softmax to a result (e.g., the score matrix S) of an operation between the query vector and the key vector. Softmax may be understood as normalizing the result of the operation between the query vector and the key vector, and may be performed by a corresponding Softmax layer. Next, the self-attention model 320 may generate output data based on an operation between the output of softmax and the value vector, and calculate intermediate data 331 by inputting the generated output data to an example neural network including a plurality convolutional layers.

According to an example, the first layer 311 of the computing apparatus may perform cross-attention through a cross-attention model 330. The cross-attention model 330 of the first layer 311 may include an attention layer. The computing apparatus may improve a plurality of feature maps generated from a feature map extraction model (e.g., the feature map extraction model 110 of FIG. 1) by performing the cross-attention. The cross-attention model 330 of the first layer 311 may be a deformable attention model, which is a type of the cross-attention model 330.

FIGS. 4A and 4B illustrate an example of a deformable attention model as a type of a cross-attention model (e.g., the cross-attention model 330 of FIG. 3).

The deformable attention model may be a model designed to skip calculation of a similarity matrix between a query and a key that requires a large amount of computation. In a typical cross-attention model, a similarity matrix between a query and a key is calculated and the attention is performed on a region having a high similarity between the query and the key, whereas, in the deformable attention model, a region to perform the attention may be sampled directly from the query.

FIG. 4A illustrates an existing deformable attention model if the same were to be applied with respect to such bounding box query information. In this deformable attention model, a multi-layer perceptron (MLP) 402 that receives a query vector 401 as an input and outputs a sampling offset 403 may be used. The MLP 402 may estimate the sampling offset 403 based on the input of the query vector 401. In this deformable attention model, the first position information of a bounding box may be used as the query vector 401 to effectively limit an attention region. That is, in this deformable attention model, the sampling offset 403 may be set based on the center of the bounding box. In the existing deformable attention model, a region to perform the attention may be sampled in a feature map 405 of an input image by using a reference point 404 and the sampling offset 403. In this deformable attention model, a value may be set based on feature maps, a key may be set by performing positional encoding on the feature map, and a query may be set based on content information and position estimation information corresponding to an object query. In this case, the number of sampling offsets (e.g., S) may be a much smaller value than the number of feature maps (e.g., M) to be set as values. When N query vectors, M key features, and M value features (e.g., feature maps) are input, an output of this deformable attention model may be a matrix having a size of N×C. In this case, the matrix having a size of N×C may be represented by N vectors, and each of the N vectors may be calculated by a weighted sum of S feature maps among the M feature maps.

FIG. 4B illustrates an example deformable attention model according to one or more embodiments. In the example deformable attention model of FIG. 4B, a region to perform the attention may be directly sampled in the feature map 405 for an input image based on position estimation information 422 corresponding to an object query. The position estimation information 422 corresponding to the object query may include first position information 422-1 of a bounding box corresponding to the object query and second position information 422-2 of key points corresponding to the object query. In one example, in the example deformable attention model, points corresponding to position coordinates included in the first position information 422-1 of the bounding box may be set as reference points, and points corresponding to position coordinates included in the second position information 422-2 of the key points may be set as sampling offsets, thereby directly sampling the region to perform the attention in the feature map 405 for the input image (e.g., the input image 101 in FIG. 1 or the input image 201 in FIG. 2). In the example deformable attention model, a reference point and an offset point may be input instead of an input of the key described above with respect to FIG. 4A. As will be described later, in an example deformable attention model, a reference point may be set based on the first position information of bounding box information, and a sampling offset may be set based on the second position information of key points. Since the key points are a plurality of sampling points representing an object, the second position information of the key points may be directly set as the sampling offset. Compared to the deformable attention model of FIG. 4A, the deformable attention model of FIG. 4B does not require the use of the typical MLP for estimating a sampling offset. Thus, it is advantageous that quality of an attention region may be increased while reducing the amount of calculation compared to the deformable attention model of FIG. 4A.

Returning to FIG. 3, the computing apparatus may calculate a query to be input to the cross-attention model 330 of the first layer 311, based on the intermediate data 331 for the first layer 311 calculated from the self-attention model 320 of the first layer 311 and the position estimation information 322 corresponding to one object query loaded from the learnable query model. In one example, the computing apparatus may generate the corrected position estimation information 323 by performing positional encoding on the position estimation information 322 including the first position information 322-1 of the bounding box and the second position information 322-2 of the key points corresponding to one object query. The computing apparatus may calculate a query to be input to the cross-attention model 330 based on the intermediate data 331 for the first layer 311 calculated from the self-attention model 320 of the first layer 311 and the corrected position estimation information 323.

In addition, the computing apparatus may set a reference point to be input to the cross-attention model 330 based on the first position information 322-1 of the bounding box corresponding to one object query loaded from the learnable query model (e.g., the learnable query memory 122 in FIG. 1). For example, the computing apparatus may set points corresponding to position coordinates (e.g., position coordinates of a first vertex and position coordinates of a second vertex) included in first position information of a bounding box corresponding to one object query as reference points. In another example, the computing apparatus may set a center point between position coordinates included in first position information of a bounding box as a reference point.

The computing apparatus may set a sampling offset to be input to the cross-attention model 330 based on the second position information 322-2 of the key points corresponding to one object query loaded from the learnable query model (e.g., the learnable query memory 122 in FIG. 1). For example, the computing apparatus may set the points corresponding to the position coordinates included in the second position information 322-2 of the key points corresponding to one object query as sampling offsets. In other words, the computing apparatus may set the key points corresponding to one object query as sampling offsets to be input to the cross-attention model 330. The computing apparatus may directly train a determined important attention region in the feature map of the input image through the cross-attention model 330 by using the key points corresponding to one object query as the sampling offsets, thereby increasing the attention performance.

The computing apparatus may load a plurality of feature maps having different resolutions generated from the feature map extraction model (e.g., the feature map extraction model 110 in FIG. 1), and set one or more feature maps (e.g., the feature map 341) among the plurality of loaded feature maps as a value to be input to the cross-attention model 330. FIG. 3 shows an example in which one feature map 341 is input as a value of the cross-attention model 330 of the first layer 311, but the example is not limited thereto, and a plurality of feature maps may be input to the cross-attention model 330.

The cross-attention model 330 may perform the cross-attention by using the query, reference point, sampling offsets, and value provided to the cross-attention model 330, and may generate final data 351 for the first layer 311 as a result of performing the cross-attention.

According to an example, the computing apparatus may transmit the final data 351 of the first layer 311 calculated from the cross-attention model 330 of the first layer 311 to a decoder embedding model (e.g., the decoder embedding memory 121 of FIG. 1). The decoder embedding model may update the final data 351 for the first layer 311 received from the cross-attention model 330 of the first layer 311 as the content information of the object indicated by the one object query, and store the updated content information.

According to an example, the computing apparatus may utilize the final data 351 calculated from the cross-attention model 330 of the first layer 311 and the position estimation information 322 corresponding to one object query loaded from the learnable query model (e.g., the learnable query memory 122 in FIG. 1) in a query improvement operation 360 of the first layer 311. The query improvement operation 360 may include a bounding box improvement operation 361 and a key point improvement operation 362. The query improvement operation 360 may include a calculation of each of a relative offset for first position information of a bounding box corresponding to one object query and a relative offset for second position information of key points corresponding to one object query, based on the final data 351 for the first layer 311 calculated from the cross-attention model 330 of the first layer 311 and the position estimation information 322 corresponding to one object query loaded from the learnable query model (e.g., the learnable query memory 122 in FIG. 1).

The bounding box improvement operation 361 may include calculation of a first relative offset for the first position information 322-1 of the bounding box corresponding to one object query based on the final data 351 output from the cross-attention model 330 and the first position information 322-1 of the bounding box. The bounding box improvement operation 361 may include transmission/provision of the calculated relative offset for the first position information of the bounding box to the learnable query memory (e.g., the learnable query memory 122 in FIG. 1). The learnable query model may update the position information of the bounding box corresponding to one previously stored object query based on the received first relative offset for the first position information of the bounding box. For example, the learnable query memory may update the first position information of the bounding box by summing the first relative offset value for the position information of the corresponding bounding box to each of position coordinates of the bounding box corresponding to one object query. For example, the processor of the computing apparatus may perform this summing or the memory storage may be representative of processor that performs the summing.

Similarly, the key point improvement operation 362 may include calculation of a second relative offset for the second position information 322-2 of the key point corresponding to one object query based on the final data 351 output from the cross-attention model 330 and the second position information 322-2 of the key point. The key point improvement operation 362 may include transmission/provision of the calculated relative offset for the second position information of the key point to the learnable query memory (e.g., the learnable query memory 122 in FIG. 1). The learnable query memory may update the second position information of the key point corresponding to one previously stored object query based on the received second relative offset for the position information of the key point. For example, the learnable query model may update the second position information of the key point by similar summing of the second relative offset value for the position information of the corresponding key point to each of position coordinates of the key points corresponding to one object query.

In order to update the position estimation information corresponding to one object query even in the second layer 312 which is the next layer of the first layer 311, the computing apparatus may use the updated content information (e.g., the final data 351) generated/stored by the decoder embedding model (e.g., the decoder embedding memory 121 in FIG. 1) and the updated position estimation information stored in the learnable query memory (e.g., the learnable query memory 122 in FIG. 1). Similarly to the operation performed in the first layer 311, the computing apparatus may update the content information corresponding to one object query and the position estimation information corresponding to one object query by performing the self-attention and the cross-attention in the second layer 312.

FIG. 5 illustrates an example computing apparatus and method according to one or more embodiments. As a non-limiting example, the computing apparatus may correspond to the computing apparatus 100 or the electronic device or system 10 of FIG. 1.

An computing apparatus 500 according to an example may include a feature map extraction model 510 and a transformer network 520. The computing apparatus 500 may be configured to receive an input image 501 (e.g., captured by the image sensor 20 and/or received by the communication system 30 of FIG. 1) and input the input image 501 to the feature map extraction model 510, and the feature map extraction model 510 may generate a plurality of feature maps 511, 512, 513, and 514 having different resolutions for the input image 501 based on the input of the input image 501. The computing apparatus 500 may input the generated feature maps to the transformer network 520. The computing apparatus may preset a plurality of object queries (e.g., an object query 521, an object query 522, and the like). As described above, each object query (e.g., the object query 521) may include content information on an object indicated by a corresponding object query and position estimation information on an object indicated by the corresponding object query. The transformer network 520 may update the content information and the position estimation information for each object query in each of a plurality of layers (e.g., a layer 541, a layer 542, and the like). The transformer network 520 may output the content information and the position estimation information of each of the set object queries as output data.

In operation 531, the computing apparatus 500 may predict a bounding box surrounding an object indicated by one object query based on first position information of a bounding box among the pieces of position estimation information corresponding to one object query output from the transformer network 520.

In operation 532, the computing apparatus 500 may predict a pose of the object indicated by one object query based on second position information of key points among the pieces of position estimation information corresponding to one object query output from the transformer network 520.

The computing apparatus 500 may further include a task performing model (or operation) 530. The task performing model 530 may be configured to receive the content information and the position estimation information for each of the object queries, which are output data output from the transformer network 520.

In operation 533, the task performing model 530 may be configured to identify a class for the object indicated by one object query based on the content information and the position estimation information corresponding to one object query output from the transformer network 520. The task performing model 530 may be a neural network model and may have a MLP structure. For example, the task performing model 530 may identify a class for an object indicated by one object query using a multi-object classification technique such as random forests. The task performing model 530 may calculate a probability value for each preset class using the first position information of the bounding box and the second position information of the key points corresponding to one object query, and may identify a class of an object indicated by one object query based on the probability value calculated for each class. For example, the task performing model 530 may determine the object indicated by one object query as a pedestrian class.

In operation 534, the task performing model 530 may be configured to generate a segmentation mask corresponding to the object indicated by one object query based on the content information and the position estimation information corresponding to one object query output from the transformer network 520. The segmentation mask may represent segmented image regions. In other words, the task performing model 530 may generate a segmentation mask for a corresponding object by segmenting pixels corresponding to an object indicated by one object query in the input image. In addition, the tasks performed by the task performing model 530 are not limited to the identifying of a class for an object and the generating of a segmentation mask for the object, and the task performing model 530 may also additionally perform other tasks through an additional MLP structure.

The computing apparatus 500 may train the transformer network 520 together with the feature map extraction model 510 by end-to-end method. The computing apparatus 500 may generate a plurality of temporary feature maps for a training input image based on an input of the training input image to the feature map extraction model 510. The computing apparatus 500 may calculate temporary position estimation information including temporary first position information of a bounding box and temporary second position information of key points for each of preset object queries based on the input of the generated temporary feature maps to the transformer network 520. The computing apparatus 500 may calculate a loss function based on training output data including training first position information of the bounding box and training second position information of key points of each of objects included in the training input image and the calculated temporary position estimation information, and may train the transformer network 520 to minimize the calculated loss function.

The processors, memories, electronic devices, apparatuses, and other apparatuses, devices, units, modules, and components described herein with respect to FIGS. 1-5 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An apparatus, comprising: a memory configured to store a transformer network comprising a first transformer layer and a second transformer layer, wherein the first transformer layer comprises a first self-attention model and a first cross-attention model, wherein the second transformer layer comprises a second self-attention model and a second cross-attention model; one or more processors configured to: generate a feature map based on an input image; obtain content information on a feature of the input image and position estimation information corresponding to an object query, wherein the position estimation information comprises first position information of a bounding box corresponding to the object query and second position information of key points corresponding to the object query; generate, based on the first self-attention model, first intermediate data by performing first self-attention on the content information; and generate, based on the first cross-attention model, first output data by performing first cross-attention on the feature map and the first intermediate data, wherein, for performing the first cross-attention, the one or more processors are configured to: set a reference point to be input to the first cross-attention model based on the first position information of the bounding box; set a sampling offset to be input to the first cross-attention model based on the second position information of the key points; and perform the first cross-attention on the feature map and the first intermediate data using the reference point and the sampling offset, and wherein the one or more processors are further configured to: update the first position information of the bounding box based on the first output data; update the second position information of the key points based on the first output data; update, the content information as the first output data; generate, based on the second self-attention model, second intermediate data by performing self-attention on the updated content information; generate based on the second cross-attention model, second output data by performing second cross-attention on the feature map and the second intermediate data; and reupdate the content information and the position estimation information based on the second output data.

2. The apparatus of claim 1, wherein the key points corresponding to the object query indicate a plurality of sampling points representing a physical structure or shape of one object positioned in the input image indicated by the object query.

3. The apparatus of claim 1, wherein the one or more processors are configured to:

calculate a key and a query to be input to the second self-attention model of the second transformed layer, based on the updated content information and the updated position estimation information.

4. The apparatus of claim 3, wherein the one or more processors are configured to:

determine the feature maps as a value to be input to the second cross-attention model of the second transformer layer.

5. The apparatus of claim 1, wherein the one or more processors are configured to:

generate, based on the second self-attention model of the second transformer layer, second intermediate data by performing self-attention on the updated content information; and calculate a query to be input to the second cross-attention model of the second transformer layer, based on second intermediate data and the updated position estimation information corresponding to the object query.

6. The apparatus of claim 1, wherein the one or more processors are configured to:

set a reference point to be input to the second cross-attention model of the second transformer layer based on the updated first position information of the bounding box; and set a sampling offset to be input to the second cross-attention model of the second transformer layer based on the updated second position information of the key points.

7. The apparatus of claim 1, wherein the one or more processors are configured to:

calculate a first relative offset for the first position information and a second relative offset, based on the first output data and the position estimation information, update the first position information as a sum of the first position information and the first relative offset, and update the second position information as a sum of the second position information and the second relative offset.

8. The apparatus of claim 1, further comprising:

a task performing model configured to perform at least one of identification of a class for an object indicated by the object query or generation of a segmentation mask corresponding to the object indicated by the object query based on the content information and the position estimation information corresponding to the object query output from the transformer network.

9. The apparatus of claim 1, wherein the one or more processors are configured to: generate a temporary feature map for a training input image based on an input of the training input image to a feature map extraction model; calculate, for each of preset object queries, temporary position estimation information comprising temporary first position information of a bounding box and temporary second position information of key points, based on an input of the temporary feature map to an in-training transformer network; calculate a loss function based on the calculated temporary position estimation information and training output data; and generate the transformer network by iteratively training of the in-training transformer network to minimize the calculated loss function.

10. The apparatus of claim 1, wherein the one or more processors are configured to:

generate a first feature map and a second feature map having respective different resolutions based on the input image;

generate, based on the first cross-attention model, the first output data by performing the first cross-attention on the first feature map and the first intermediate data; and generate, based on the second cross-attention model, the second output data by performing the second cross-attention on the second feature map and the second intermediate data.

11. A processor-implemented method, comprising: generating a feature map based on an input image; and obtaining content information on a feature of the input image and position estimation information corresponding to an object query, wherein the position estimation information comprises first position information of a bounding box corresponding to the object query and second position information of key points corresponding to the object query; generating, based on a first self-attention model comprising a first self-attention model and a first cross-attention model, first intermediate data by performing first self-attention on the content information; generating, based on the first cross-attention model, first output data by performing first cross-attention on the feature map and the first intermediate data, wherein, the performing the first cross-attention comprises: setting a reference point to be input to the first cross-attention model based on the first position information of the bounding box; setting a sampling offset to be input to the first cross-attention model based on the second position information of the key points; and performing the first cross-attention on the feature map and the first intermediate data using the reference point and the sampling offset; updating the first position information of the bounding box based on the first output data; updating the second position information of the key points based on the first output data; updating, the content information as the first output data; generating, based on a second self-attention model, second intermediate data by performing self-attention on the updated content information; generating, based on a second cross-attention model, second output data by performing second cross-attention on the feature map and the second intermediate data; and reupdating the content information and the position estimation information based on the second output data.

12. The method of claim 11, wherein the key points corresponding to the object query indicate a plurality of sampling points representing a physical structure or shape of one object positioned in the input image indicated by the object query.

13. The method of claim 11, wherein the updating comprises:

calculating a key and a query to be input to the second self-attention memory of the second target transformed layer, based on the updated content information, and the updated position estimation information.

14. The method of claim 13, wherein the feature map is determined as a value to be input to the second cross-attention model of the second target transformer layer.

15. The method of claim 11, wherein the method further comprises:

generating, based on the second self-attention model of the second transformer laver, second intermediate data by performing self-attention on the updated content information, and wherein the updating comprises:

calculating a query to be input to the second cross-attention model of the second target transformer layer, based on second intermediate data and the updated position estimation information corresponding to the object query.

16. The method of claim 11, wherein the updating comprises:

setting a reference point to be input to the second cross-attention model of the second target transformer layer based on the updated first position information of the bounding box; and setting a sampling offset to be input to the second cross-attention model of the second transformer layer based on the updated second position information of the key points.

17. The method of claim 11, further comprising:

calculating a first relative offset for the first position information and a second relative offset, based on the first output data and the position estimation information;

updating the first position information as a sum of the first position information and the first relative offset; and updating the second position information as a sum of the second position information and the second relative offset.

18. The method of claim 11, further comprising:

performing at least one of identification of a class for an object indicated by the object query or generation of a segmentation mask corresponding to the object indicated by the object query based on the content information and the position estimation information corresponding to the object query output from the transformer network.

* * * * *